United States Patent [19]

Cox

[11] 3,769,567
[45] Oct. 30, 1973

[54] BATTERY CHARGING SYSTEM
[75] Inventor: Charles W. Cox, Houston, Tex.
[73] Assignee: Automatic Power, Inc., Houston, Tex.
[22] Filed: June 14, 1972
[21] Appl. No.: 262,688

[52] U.S. Cl.............. 320/27, 320/39, 320/71, 322/28, 322/91, 322/98
[51] Int. Cl............................................ H02j 7/14
[58] Field of Search ............... 322/20, 28, 91, 95, 322/96, 97, 98; 320/27, 39, 61, 71

[56] References Cited
UNITED STATES PATENTS
3,633,090  1/1972  Hill ............................ 322/91 X
3,059,169  10/1962  Raver et al. .................. 322/98 X
3,151,288  9/1964  Arizienis et al. ............... 322/28
3,174,092  3/1965  Johnson ........................ 322/98
3,278,823  10/1966  Ross ........................... 322/91 X Primary Examiner—J. D. Miller
Assistant Examiner—Robert J. Hickey
Attorney—W. F. Hyer et al.

[57] ABSTRACT

A generator battery charging system is disclosed in which a shunt load is periodically switched across the output of the generator during periods of low charging current requirements from the battery to provide a substantially constant load on the generator.

13 Claims, 5 Drawing Figures

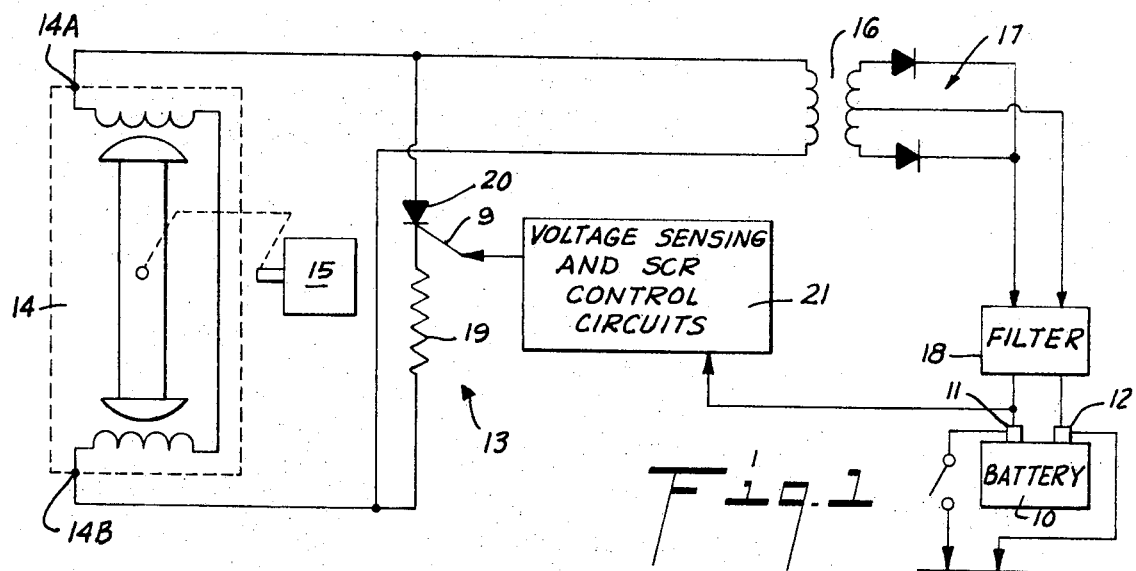
Fig. 1
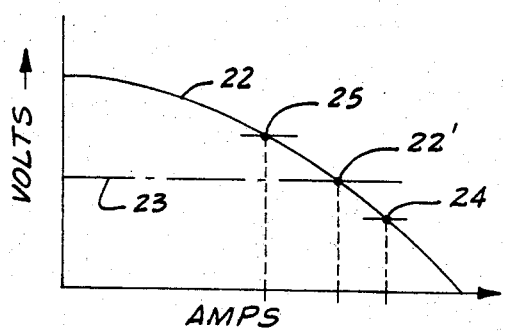
Fig. 2
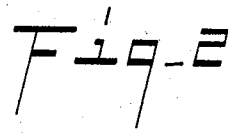
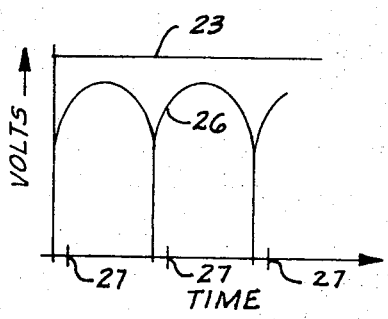
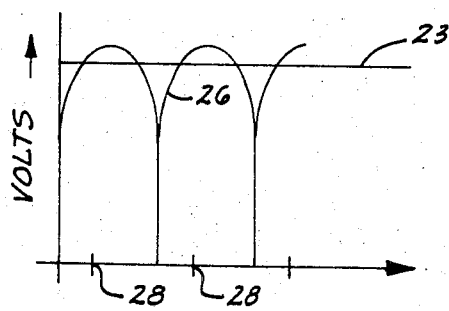
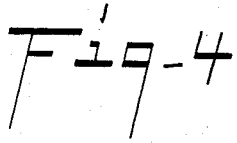
Fig. 4

BATTERY CHARGING SYSTEM

This invention relates to apparatus for regulating the load on a prime mover driven generator being used to charge a battery.

In past battery charging systems where a prime mover driven generator has been the source of charging voltage, it has been customary to provide voltage and/or current regulators which control the charging voltage and current to the battery. However, these regulators are designed to prevent excessive charging of the battery and not to provide a substantially constant load for the prime mover.

This is particularly desirable where the generator is driven by a diesel engine, such as the case on many power systems used at remote, unattended locations, as on an offshore platform. A diesel engine when operating with a light load or a cycling load has the characteristic of running too cool and/or operating with poor fuel combustion which can cause accelerated engine wear. Obviously such a situation is undesirable in the offshore application noted. Also, an unloaded condition on the generator can result in early failure of the generator.

As examples of the prior art, in each of U. S. Pat. Nos. 1,762,297, 1,834,280, and 1,162,027, a shunt resistor is provided to shunt the output of the generator when the generator voltage exceeds a predetermined amount. In these prior apparatus, the shunt load is fixed and connected to the generator only during extreme battery conditions, such as battery failure, and there is no provision for regulating the amount of the shunt load in relation to the battery load to provide a substantially constant load to the generator, and thus the prime mover, irrespective of battery condition. Also, mechanical switches or relays are used in these apparatus which are unsuitable for use in long unattended service in adverse environments.

In U. S. Pat. No. 3,447,059, a variable shunt load is provided across a battery which diverts changing current from the battery during low charging current demand periods. However, this patent is not directed to maintaining a substantially constant load on a prime mover driven generator and in fact, the shunt regulator is not adapted to be operable until the battery terminal voltage exceeds a preselected value above the point at which battery charge demand has lessened.

It is thus an object of this invention to provide a battery charging system and regulation apparatus therefor utilizing a prime mover driven generator as a source of charging current, and in which a substantially constant generator load is provided during varying conditions of battery charge or ultimate load demand.

Another object of this invention is to provide such a system and apparatus in which a substantially constant charge voltage to the battery is provided even during changing generator temperature or speed conditions.

Another object of this invention is to provide such apparatus which is solid state, of reasonably simple and inexpensive construction, and has relatively long life when used unattended at adverse locations.

These and other objects of this invention, which will be apparent upon consideration of the appended drawings and claims, and the following detailed description, are accomplished according to the illustrated embodiment of this invention by providing a variable shunt load across a prime mover driven generator providing an alternating current charging voltage. The time that the shunt is connected across the generator to draw current therefrom during each charging voltage cycle is controlled by a sensing circuit that is responsive to the voltage of a battery being charged, and the phase of the charging signal. When the battery voltage is high, and the charging or load current low, the shunt is connected across the generator output early in each alternating current cycle, and thus for substantially all of the voltage cycle, and a relatively large current is drawn by the shunt load. When battery condition is poor or load demand high, the shunt load is connected across the generator later in the alternating current cycle, and the current required is drawn by the battery instead of the shunt load. The apparatus can be adjusted so that the charging voltage for the battery is well regulated at a predetermined voltage, or between predetermined limits, and the load on the generator is substantially constant. Also, the regulation provided compensates for changes in generator output voltage due to temperature and/or engine speed changes.

In the drawings, wherein like reference numerals are used throughout to designate like parts, and wherein a preferred embodiment of this invention is illustrated, FIG. 1 is a partial schematic and block diagram of a voltage generator charging system utilizing this invention;

FIG. 2 is a graph illustrating the relationship between voltage and current at the output of the generator of FIG. 1;

FIG. 3 is a graph showing the relationship between the battery charging voltage and battery voltage when battery voltage is relatively high;

FIG. 4 is a graph showing the relationship between the battery charging voltage and battery voltage when battery voltage is relatively low.

Figure 5:
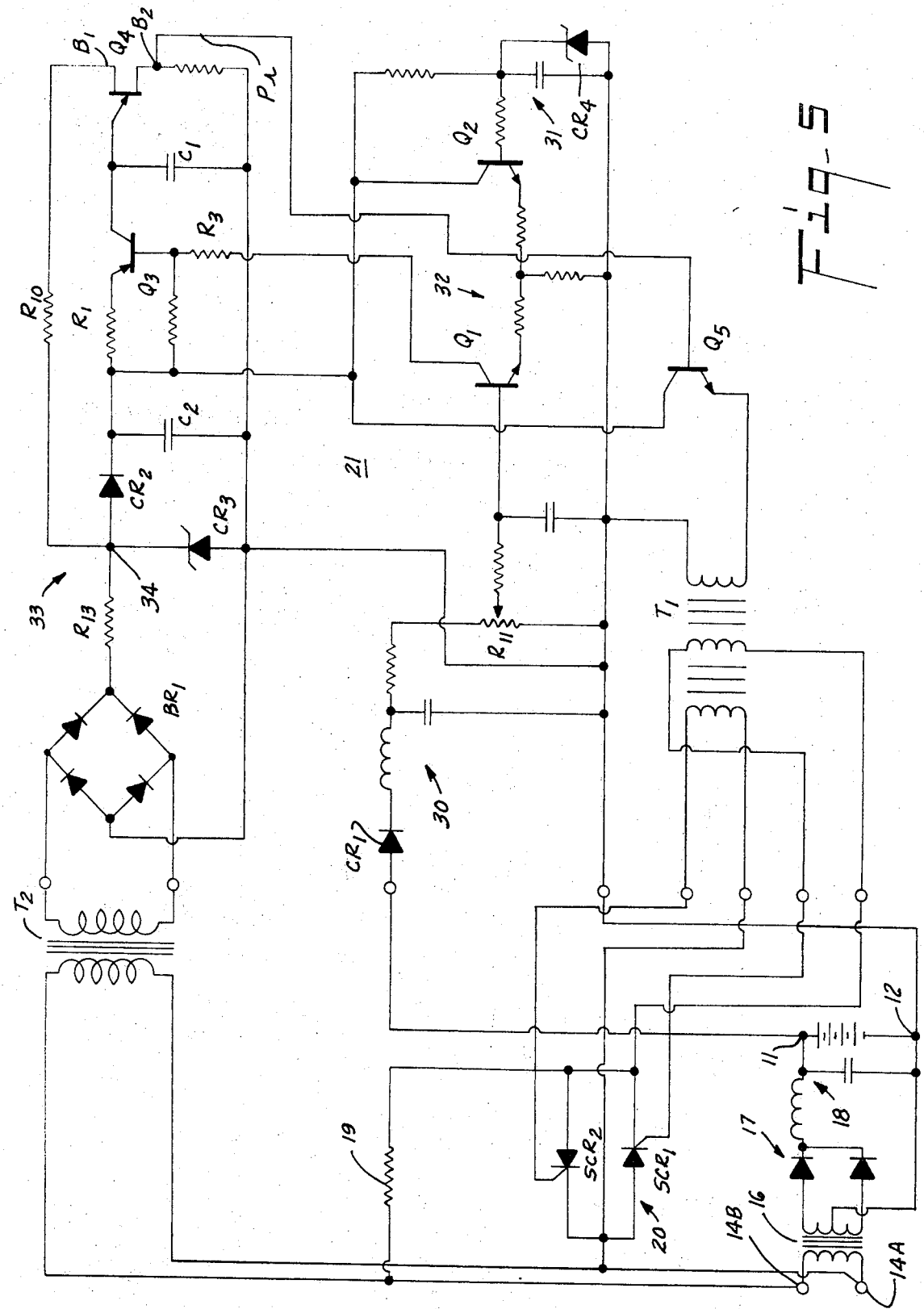
FIG. 5 is a detailed schematic of a system such shown in FIG. 1.

Referring now to the drawings, in FIG. 1, a D.C. storage battery 10 is illustrated as being connected at its terminals 11 and 12 to a charging system 13, and to a load L, such as offshore warning lights or fog horns. Charging system 13 includes a permanent magnet generator 14 which is driven by a prime mover, such as a diesel engine 15, and provides an alternating current charging voltage at the output terminals 14A and 14B. Means is connected to output terminals 14A and 14B for responding to the alternating current voltage output of generator 14 to provide a suitable charging voltage to battery 10. In the preferred embodiment of this invention illustrated in FIG. 1, this means includes an isolation transformer 16 connected at its primary across terminals 14A and 14B, diode rectifiers 17 connected to the secondary of transformer 16 to provide a full-wave rectifier charging voltage for battery 10, and a filter circuit 18 connected between rectifiers 17 and battery 10 to provide a filtered D.C. charging voltage for battery 10.

A shunt means if connected across terminals 14A and 14B and is adapted to provide a variable load for generator 14. In the illustrated embodiment this shunt means includes a ballast resistor 19 connected on one side to terminal 14B, and a SCR switch 20 connected by its power electrodes between the other side of resistor 19 and terminal 14A. SCR 20 is arranged to provide one state in which conduction of current between terminal 14A and 14B and through resistor 19 is interrupted, and a second state in response to a trigger signal at its gate electrode g in which such current is conducted through resistor 19. The triggering signal for the gate electrode of SCR 20 is provided by a sensing means, shown as circuit 21 in FIG. 1, which is connected between battery 10 and electrode g and is responsive to the battery voltage to provide the triggering signal, so that a substantially constant load is provided for generator 10 by balancing the load between resistor 19 and battery 10.

As hereafter explained in detail with reference to FIG. 5, circuit 21 is also responsive to the phase of the alternating current output of generator 14 so that the time that SCR 20 is in its conductive state, permitting resistor 19 to draw current during each alternating current cycle, is a function of the voltage on battery 10 and thus the current demand of load L.

FIGS. 2–4 illustrate the regulating function of system 13. In FIG. 2, the curved line 22 shows the relationship of voltage and current at output terminals 14A and 14B of generator 14, the dotted line 23 represents a normal battery voltage condition for battery 10, and the intersection 22' of lines 22 and 23A represents a satisfactory current level for maintaining generator 14 and motor 15 operations efficiently. The prime objective of the present invention is to maintain the generator voltage and current within a suitable range on curve 22 above and below point 22', within which the required charging voltage is provided to the battery when needed, and the load on the generator is maintained at a sufficient level.

Generator 14 includes a permanent magnet rotor and is non-overloading so that it can be operated to provide the voltage current relationship illustrated at any point on curve 22. Of course, the available voltage and current will also be function of engine speed or temperature of the permanent magnet so that a different voltage - amperage curve 22 would be provided for different engine speeds or operating temperatures. Without the regulating function of this invention, when the battery voltage is high, substantially no load would be drawn from generator 14, and curve 22 would be in the high voltage, low current end. However, because of the regulation provided by this invention, as illustrated by FIG. 2, when the battery charge requirements or load L requirements on generator 14 are at a minimum, shunt resistor 19 will draw substantial current and the generator voltage may be maintained at a point 24 on curve 22, below voltage line 23. However, when full battery charging current is required or load L is turned on (such as by closing a switch SW connected between load L and battery 10), the current drawn by resistor 19 decreases to a small value and the generator voltage rises to the level of a point 25 on curve 22, above the voltage level 23. For purposes of this disclosure and description of this invention, the reference to maintaining a substantially constant load on generator 14, or a well regulated charging voltage to battery 10, refers to maintainance of the generator output between limits, such as between points 24 and 25 in FIG. 2, between which limits the generator load is sufficient to avoid inefficient generator or engine operations.

FIGS. 3 and 4 illustrate how circuit 21 operates to control the amount of current drawn by resistor 19 during each alternating current cycle of the output voltage of generator 14. A line 23 is illustrated in each of these FIGS. which represents battery voltage, and the alternating current waveform 26 represents the magnitude of the rectified charging signal at the input of filter 18. In FIG. 3 the battery voltage represented by line 23 is relatively high and at a value indicating that battery condition is good, or load L is off. With these conditions, circuit 21 responds to the battery voltage to provide the trigger signal for SCR 20 early in each half cycle of waveform 26, for example, at points 27, and current from generator 14 will be conducted through resistor 19 for substantially all of the voltage cycle. When SCR 20 is turned on and current flows through its power electrodes, this current flow latches the SCR in its conductive state until the current falls below a predetermined value, such as occurs when the waveform 26 goes in the negative direction. Since a higher current is thus drawn from generator 14 because of the shunt load, lower charging voltage for battery 10 is produced and no charging current is drawn by battery 10. However, when load L is applied to battery 10, or the condition of the battery is poor, so that the battery voltage represented by line 23 is lowered, circuit 21 responds to the lower battery volage to provide the trigger signal later in each half cycle of waveform 26, for example, at points 28 in FIG. 4, and current from generator 14 will be conducted through resistor 19 for only a short time in each half cycle. In this case, the current drawn by shunt resistor 19 will be low and the charging voltage raised to a level sufficient to charge the battery.

Referring now to FIG. 5, preferred circuitry for controlling the turn-on times of SCR 20 is shown. In this FIG., SCR 20 is replaced by twos SCRs noted as SCR 1 and SCR 2, connected with opposite polarity across each other so that one conducts negative going current of the alternating current changing signal, and the other conducts such positive going current. Their gate electrodes are connected to opposite sides of the secondary of an isolation transformer $T_1$ so that the triggering signals to each SCR are 180° out of phase and the correct SCR conducts during the cycle of corrent polarity. Transformer $T_1$ is the output of sensing circuit 21 which comprises transistors $Q_1$, $Q_2$, $Q_3$, $Q_4$, and $Q_5$, and their associated components. Battery voltage on terminal 11 is sensed by circuit 21 by conducting this voltage through a diode $CR_1$, a filter 30, which filters out load transients, and a variable resistor $R_{11}$ to the base of transistor $Q_1$. Transistors $Q_1$ and $Q_2$ and their associated components form a difference amplifier 32 and the base of transistor $Q_2$ is connected to a source of reference voltage 31 provided by a zenor diode $CR_4$. Difference amplifier 31 responds to a difference in the voltages at the bases of $Q_1$ and $Q_2$ to provide an output or error signal at the collector of $Q_1$.

A circuit means 33 is provided to provide the triggering signals for SCR 1 and SCR 2, in accordance with the battery voltage and time relationships previously noted with respect to the description of FIG. 3 and FIG. 4. Circuit means 33 is connected to the output of difference amplifier 32 and is responsive thereto, and is also responsive to the phase of the alternating current charging voltage from generator 14. Circuit means 33 is illustrated in FIG. 5 as including transistor $Q_3$ and its associated components, and unijunction transistor $Q_4$ and its associated components, including a storage capacitor $C_1$, connected to the gate electrode of unijunction $Q_4$. Circuit means 33 also includes a transformer $T_2$, connected at its primary to the alternating current output of generator 14, and a bridge rectifier $BR_1$ connected to the secondary of transformer, to provide a rectified voltage which is conducted by a resistor $R_{13}$ to a junction 34. The voltage at junction 34 is clamped by a diode $CR_3$ at, for example, 19 volts. This rectified voltage is conducted through a resistor $R_{10}$ to the base $B_1$ of unijunction transistor $Q_4$, so that the potential on this base fluctuates in accordance with the voltage and phase of the alternating current charging signal from generator 14, and the operation of unijunction $Q_4$ is synchronized to the A.C. charging voltage.

D.C. voltage for circuits 31 and 33, such as at the collector of transistors $Q_1$, $Q_2$, and $Q_5$ and the emitter of transistor $Q_3$, is provided by conducting voltage from junction 34 through a diode $CR_2$ and filtering this voltage with a capacitor $C_2$.

Capacitor $C_1$ is also connected to the collector of transistor $Q_3$ and the base of this transistor is connected through resistor $R_3$ to the collector of transistor $Q_1$. Charging voltage for capacitor $C_1$ is conducted through a resistor $R_1$, connected between junction 34 and the emitter of transistor $Q_3$, and through transistor $Q_3$, which functions as a series variable impedance controlled by the error signal at its base. Thus, the state of charge of capacitor $C_1$ is dependent on the state of conduction of transistor $Q_3$, and the latter is dependent on the magnitude of the error signal from difference amplifier 32. Unijunction transistor $Q_4$ fires to provide a pulse P at its base $B_2$ as a function of the fluctuating voltage on base $B_1$ and the charge on capacitor $C_1$, so that the time that pulse P is provided during each half cycle of the A.C. charging voltage is varied, dependent on the state of charge of capacitor $C_1$.

Pulse P is conducted to the base of a transistor $Q_5$, which drives the primary of transformer $T_1$ to provide triggering signals for static switches SCR 1 and SCR 2.

In operation, when battery 10 is in a high state of charge, potentiometer $R_{11}$ is adjusted so that transistor $Q_1$ will drive $Q_3$ just to the point of saturation. At this point, the charge time of capacitor $C_1$ is very short, causing very little delay between the zero crossing of the input A.C. charging voltage and the SCR trigger signal, such as shown in FIG. 3. SCR 1 is triggered on the positive swing of the A.C. charging voltage and SCR 2 is triggered on the negative swing of the A.C. charging voltage.

When load L is applied to battery 10, causing the battery voltage to drop, a small voltage change is sensed by the differential amplifier 32 and this difference is amplified to the base of transistor $Q_3$. Transistor $Q_3$ impedance is increased, which causes the charging time for capacitor $C_1$ to increase. This delays the firing of unijunction $Q_4$ and thus the generation of the triggering signals for SCR 1 and SCR2, which causes these SCRs to turn on later in each half cycle of the alternating current charging voltage, such as shown in FIG. 4. When battery 10 is in a low charge state or a heavy load is applied, it is preferred that the impedance of transistor $Q_3$ be increased to a value such that $C_1$ charge time is approximately the same as one half of the generator charging voltage, so that the static switch is never turned on.

Thus, depending on the voltage of battery 10, the current drawn from generator 14 from either the battery and its load, or by resistor 19, or by a combination of these, will be continuously and automatically maintained between limits 24 and 25 on curve 22, and at a safe and efficient level for operation of generator 14, engine 15, and battery 10.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for controlling the load on an engine controlled generator being used to charge a battery, comprising, in combination: means for responding to the output of such a generator to provide a charging voltage for such a battery; shunt means adapted to be connected to the output of said generator and to provide a secondary load that can be switched across said output during each cycle of said charging voltage; and sensing means adapted to be connected to said battery and connected to said shunt means, said sensing means responding to a condition of said battery to control said shunt means to automatically vary the time that said secondary load is connected to said output of said generator during each cycle of said charging voltage to provide a substantially constant load for said generator and said engine during conditions of varying battery charge load on said generator.

2. The apparatus of claim 1 wherein the output of said generator is an alternating current voltage and said shunt means includes a ballast load and a switch means connected to said ballast load and switchable in response to a trigger signal between a first state in which current from said generator is conducted through said ballast load, and a second state in which said conduction of current is interrupted, and said sensing means provides such a triggering signal in response to the phase of said alternating current voltage and the condition of said battery.

3. The apparatus of claim 2 wherein said ballast load is a resistor and said switch means includes a first SCR connected to conduct changing current through said resistor when said alternating current voltage is positive, and a second SCR connected to conduct such current when said alternating current voltage is negative.

4. The apparatus of claim 2 wherein said sensing means includes means for providing a reference voltage, means connected to said reference voltage means for comparing the voltage of said battery with said reference voltage to provide an error signal in response to a difference in said compared voltages, and trigger signal producing means responsive to the magnitude of said error signal and the phase of said alternating current voltage to provide said trigger signal.

5. The apparatus of claim 3 wherein said sensing means includes means for providing a reference voltage, means connected to said reference voltage means for comparing the voltage of said battery with said reference voltage to provide an error signal in response to a difference in said compared voltages, and trigger signal producing means responsive to the magnitude of said error signal and the phase of said alternating current voltage to provide said trigger signal.

6. The apparatus of claim 4 wherein said trigger signal producing means includes a unijunction transistor connected at one of its base electrodes to be responsive to the phase of said alternating current signal, and a storage capacitor connected to the gate electrode of said unijunction transistor and responsive to the magnitude of said error signal to control the firing of said unijunction transistor.

7. The apparatus of claim 5 wherein said trigger signal producing means includes a unijunction transistor connected at one of its base electrodes to be responsive to the phase of said alternating current signal, and a storage capacitor connected to the gate electrode of said unijunction transistor and responsive to the magnitude of said error signal to control the firing of said unijunction transistor.

8. A system for supplying battery power comprising, in combination: a battery; a prime mover driven generator providing an alternating current voltage; means connected between said battery and said generator and responding to said alternating current voltage to provide a charging voltage for said battery; a variable shunt regulator connected to shunt the alternating current output of said generator; and sensing means connected to said battery and said shunt regulator and responsive to a condition of said battery to control said shunt regulator to balance the current drawn from said generator between said battery and said shunt regulator during each cycle of said charging voltage to provide a substantially constant load to said generator.

9. The system of claim 8 wherein said generator includes a permanent magnet rotor.

10. The apparatus of claim 8 wherein said shunt regulator includes a ballast load and a switch means connected to said ballast load and switchable in response to a trigger signal between a first state in which current from said generator is conducted through said ballast load, and a second state in which said conduction of current is interrupted, and said sensing means provides such a triggering signal in response to the phase of said alternating current voltage and the condition of said battery.

11. The apparatus of claim 10 wherein said ballast load is a resistor and said switch means includes a first SCR connected to conduct changing current through said resistor when said alternating current voltage is positive, and a second SCR connected to conduct such current when said alternating current voltage is negative.

12. The apparatus of claim 10 wherein said sensing means includes means for providing a reference voltage, means connected to said reference voltage means for comparing the voltage of said battery with said reference voltage to provide an error signal in response to a difference in said compared voltages, and trigger signal producing means responsive to the magnitude of said error signal and the phase of said alternating current voltage to provide said trigger signal.

13. The apparatus of claim 8 wherein said generator is driven by a diesel engine.

* * * * *